United States Patent [19]

Hori et al.

[11] 4,271,802
[45] Jun. 9, 1981

[54] SECONDARY INTAKE GAS CONTROL SYSTEM FOR INTERNAL COMBUSTION ENGINE

[75] Inventors: Kenji Hori; Yuhiko Kiyota, both of Nagaokakyo, Japan

[73] Assignee: Mitsubishi Jidosha Kogyo Kabushiki Kaisha, Tokyo, Japan

[21] Appl. No.: 20,536

[22] Filed: Mar. 14, 1979

[30] Foreign Application Priority Data

Mar. 20, 1978 [JP] Japan .................. 53-32543

[51] Int. Cl.³ .................................. F02M 23/04
[52] U.S. Cl. ................... 123/432; 123/585; 123/588; 261/39 A
[58] Field of Search ............ 123/32 ST, 75 B, 124 R, 123/119 D, 119 DB, 30 C, 119 F, 432, 585, 586, 588; 261/39 A, 121 B, 52

[56] References Cited

U.S. PATENT DOCUMENTS

| | | | |
|---|---|---|---|
| 3,291,462 | 12/1966 | Mennesson | 261/39 A |
| 3,382,856 | 5/1968 | McIlroy | 123/119 R |
| 4,108,127 | 8/1978 | Chapin | 123/119 D X |
| 4,117,808 | 10/1978 | Takaralya | 123/75 B |
| 4,117,814 | 10/1978 | Takahashi | 123/588 X |
| 4,132,197 | 1/1979 | Hanawa et al. | 123/75 B |
| 4,133,322 | 1/1979 | Nakamura et al. | 123/75 B |
| 4,163,434 | 8/1979 | Tsukamoto et al. | 123/119 D |
| 4,167,161 | 9/1979 | Nakagami | 123/30 C X |

*Primary Examiner*—Stuart S. Levy
*Attorney, Agent, or Firm*—Oldham, Oldham, Hudak & Weber Co.

[57] ABSTRACT

A secondary intake gas control system for an internal combustion engine having a secondary intake gas supply means for supplying air or a lean mixture to a combustion chamber, comprising an air control valve means provided in a secondary intake passage means of the secondary intake gas supply means to control a supply of the air. The air control valve means comprises a valve member and actuating means therefor. The actuating means is operated by means for sensing a temperature of the engine and means for sensing an opening degree of a throttle valve to open the valve member to communicate the secondary intake passage means with atmosphere when the opening degree of the throttle valve is above predetermined value at a predetermined temperature range of the engine during warming-up thereof.

8 Claims, 8 Drawing Figures

SECONDARY INTAKE GAS CONTROL SYSTEM FOR INTERNAL COMBUSTION ENGINE

BACKGROUND OF THE INVENTION

This invention relates to a secondary intake gas control system for a spark-ignition internal combustion engine of a motor vehicle, in which the secondary intake gas inducted into the engine is optimized during warming-up of the engine when a choke valve is operated.

In conventional spark-ignition internal combustion engines of motor vehicles provided with carburetors, firing and burning of an air-fuel mixture are poor during idling or low-speed and light-loaded driving range of the engine, since due to throttling of a throttle valve the efficiency of suction of the mixture into a combustion chamber is poor and the velocity of flow of the mixture is low.

In order to prevent deterioration of said firing and burning of the mixture, it has been proposed to supply a rich air-fuel mixture having a small air-fuel ratio which is easily combustible. Also, it has been known to inject air or other gas into the combustion chamber in a predetermined direction, independently of the air-fuel mixture inducted thereinto, thereby producing a strong swirl of the mixture in the combustion chamber and consequently increasing a velocity of flame propagation. In the latter case, however, it is required to maintain always an air-fuel ratio of the entirety of the mixture and the air or gas in the combustion chamber at an appropriate value. It is also required to control the amount of the mixture to be inducted and the amount of air or gas to be injected so as to produce the strong swirl in said combustion chamber.

SUMMARY OF THE INVENTION

The main object of this invention is to provide a secondary intake gas control system for an internal combustion engine in which burning of the mixture is improved to improve a fuel consumption and reduce emission of unburned gases such as hydrocarbon (HC) and carbon oxide (CO) contained in exhaust gas when the engine is in a cold condition.

Another objection of this invention is to provide a secondary intake gas control system for an internal combustion engine equipped with a carburetor having a choke valve and a throttle valve, in which the amount of air or lean mixture injected into the combustion chamber for the purpose of producing swirl is accurately controlled according to driving conditions of the engine when the choke valve is in operation, whereby emission of the noxious gases can be remarkably reduced without causing any inconvenience such as a large power drop and deterioration of drivability and fuel consumption.

These objects of the present invention are accomplished by providing a secondary intake gas control system for a spark-ignition internal combustion engine having air-fuel mixture supply means having a throttle valve and a choke valve in a main intake passage of the engine, and a secondary intake gas supply means for injecting air or a lean air-fuel mixture into a combustion chamber in order to give a swirl and turbulence to an air-fuel mixture supplied into said combustion chamber through said air-fuel mixture supply means, said secondary intake gas supply means including an injection port opened to said combustion chamber, and secondary intake passage means communicated with said injection port through a valve which is opened at a suction stroke of the engine, said control system comprising air control valve means through which said secondary intake passage means is communicated with atmosphere upstream of the location of said choke valve in the main intake passage, said secondary intake passage means being also opened to the main intake passage downstream of the location of the choke valve, said air control valve means comprising a valve member, actuating means for actuating said valve member, means for sensing a temperature of the engine, and means for sensing a degree of opening of the throttle valve, said actuating means being operated by said means for sensing the temperature of the engine and said means for sensing the degree of opening of the throttle valve to open said valve member to communicate the secondary intake passage means with atmosphere when the degree of opening of the throttle valve is above a predetermined opening degree at a predetermined temperature range of the engine during warm-up thereof.

BRIEF DESCRIPTION OF THE DRAWINGS

This invention will be explained by way of example with reference to the accompanying drawings in which.

DESCRIPTION OF THE PREFERRED EMBODIMENTS

Figure 1:
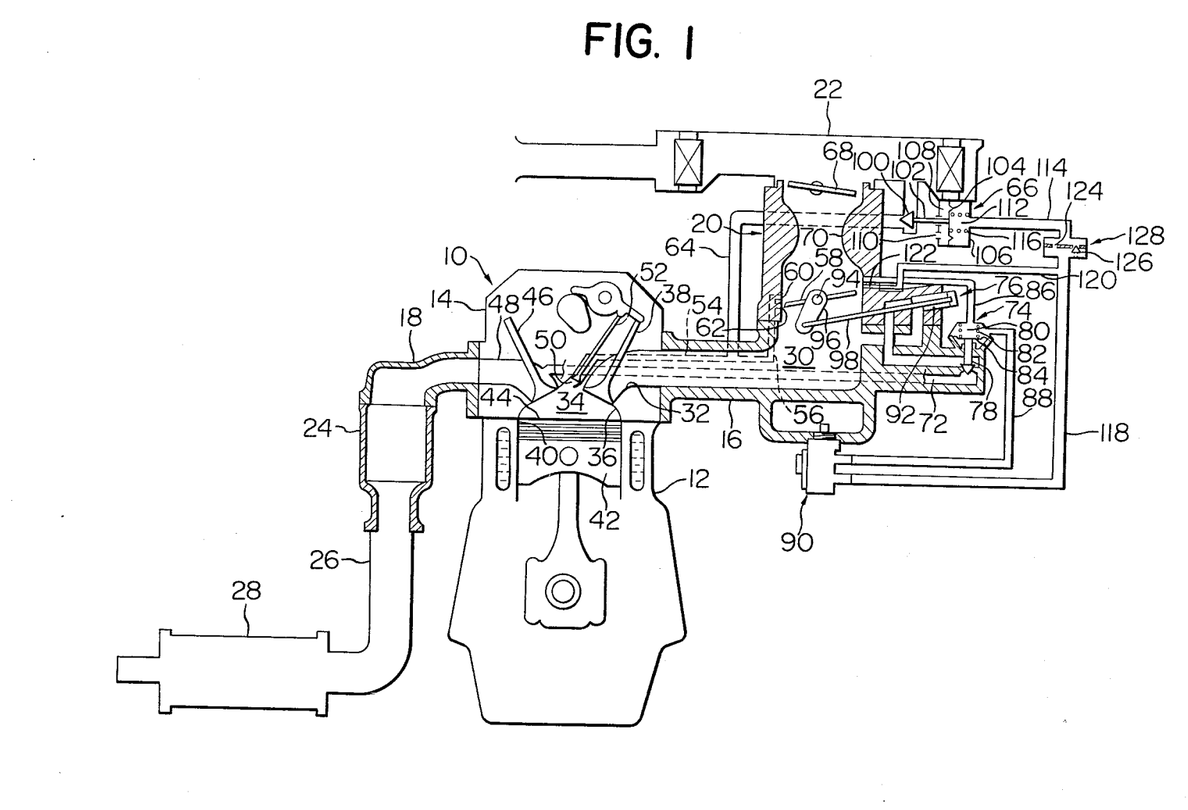
FIG. 1 is a schematic cross-section of an internal combustion engine for a motor vehicle according to the invention.

Referring to FIG. 1, a spark-ignition multi-cylinder internal combustion engine 10 for a motor vehicle is constructed mainly by a cylinder block 12 and a cylinder head 14. On one side of the cylinder head 14 an intake manifold 16 is secured, while an exhaust manifold 18 is secured on the other side. A carburetor 20 is connected to the upper open end of the intake manifold 16, and an air cleaner 22 is attached on the upper end of the carburetor 20. A catalytic converter 24 is attached to the concentrated portion of the exhaust manifold 18, and the downstream end of the converter 24 is connected to an exhaust pipe 26 which is opened to atmosphere through a silencer 28.

The air cleaner 22, the carburetor 20 and the intake manifold 16 define therein a main intake passage 30 which is connected to an inlet port 32 formed in the cylinder head 14. The inlet port 32 is opened to a hemispherical concave surface 36 of the cylinder head 14 defining a combustion chamber 34 and is opened and closed by a main inlet valve 38. The combustion chamber 34 is defined by said hemispherical concave surface 36, an inner peripheral surface 40 of a cylinder formed in the cylinder block 12 and a top surface 44 of a piston 42 slidable on the inner peripheral surface. An exhaust port 48 opened and closed by an exhaust valve 46 is also opened to the hemispherical concave surface 36 on which an injection port 50 and a spark plug, not shown, are provided. The injection port and spark plug will be described in detail hereinafter. The injection port 50 is connected to a secondary intake passage 54 through a valve 52. The upstream end of the secondary intake passage 54 is forked, and one branch passage 56 is connected to two ports 60 and 62 opened to the wall of the main intake passage 30 at given locations which are determined with relation to a throttle valve 58 provided in the main intake passage 30, while the other branch passage 64 is opened to a clean-up side of the interior of the air cleaner 22 through an air control valve 66. A choke valve 68, a venturi 70 and said throttle valve 58 are provided in their order from the upstream side toward the downstream side in the main intake passage 30 defined in the carburetor 20.

An exhaust gas recirculation passage 72 for recirculating a portion of the exhaust gas into the main intake passage 30 is defined in the cylinder head 14, the intake manifold 16 and the carburetor 20. On end of the passage 72 is connected to the exhaust port 48, while the other end is opened to the interior of the intake manifold 16 downstream of the throttle valve 58. A first control valve 74 and a second control valve 76 are provided in series in the exhaust gas recirculation passage 72. The first control valve 74 comprises a valve member 78 for opening and closing the passage 72 and a diaphragm 84 displaceable in response to a differential force created between a level of air pressure acting in a pressure chamber 80 and a biasing force of a spring 82. The valve member 78 is connected to a central portion of the diaphragm 84. The pressure chamber 80 is opened through a passage 86 to the wall of the main intake passage 30 at a location appreciably upstream of a fully closed position of the throttle valve 58. The pressure chamber 80 is also connected through a passage 88 to a thermo valve 90 described hereinafter. The second control valve 76 comprises a slidable valve member 92 connected through a link 98 to a lever 96 fixed to a throttle shaft 94 for turning the throttle valve 58. The valve member 92 opens the exhaust gas recirculation passage 72 in response to the opening movement of the throttle valve 58.

The air control valve 66 comprises a valve member 100 for opening and closing the branch passage 64. The valve member 100 is connected to a central portion of a diaphragm 104 through a rod 102. The diaphragm 104 divides the interior of a housing 106 into two chambers. One chamber 108 is opened to atmosphere through a hole 110, while the other chamber 112 is connected to a passage 114. A spring 116 is provided in the chamber 112 for urging the diaphragm 104 from the chamber 112 toward the chamber 108.

The passage 114 is forked, and one branch passage 118 is connected to the thermo valve 90, while the other branch passage 120 is connected to a port 122 opened to the wall of the main intake passage 30. The port 122 is provided in the wall of the passage at a location in which it is positioned upstream of the throttle valve 58 when the latter is in its idle open position but is positioned downstream of the throttle valve 58 when opening of the valve is above a predetermined value. In this embodiment, a degree of opening of the throttle valve 58 in its normal idle open position is set about 5° relative to its fully closed position in which the throttle valve 58 is positioned perpendicularly to the main intake passage 30. The port 122 is provided in the wall of the passage at a location in which the circumferential end wall of the throttle valve 58 faces to this port when the valve is opened by about 8° to 10° from said idle open position. An opening of the passage 86 is provided in the wall of the passage at a location in which the end wall of the throttle valve 58 faces to this opening when the valve is opened by about 12° to 15° from said idle open position. The port 122 and the opening of the passage 86 may be provided in the wall of the main intake passage at a location corresponding to idle open position of the throttle valve or the reversed locations depending on the types of engines and constructions of carburetors. In this embodiment, the carburetor is of Stromberg type commonly used and the detailed construction of this carburetor will be explained later.

A flow restriction means 128 comprising an orifice 124 and a check valve 126 provided in parallel with each other is provided in the passage 114. The check valve 126 is constructed such that flow of air is only permitted from the chamber 112 toward the port 122 or the thermo valve 90.

Figure 2:
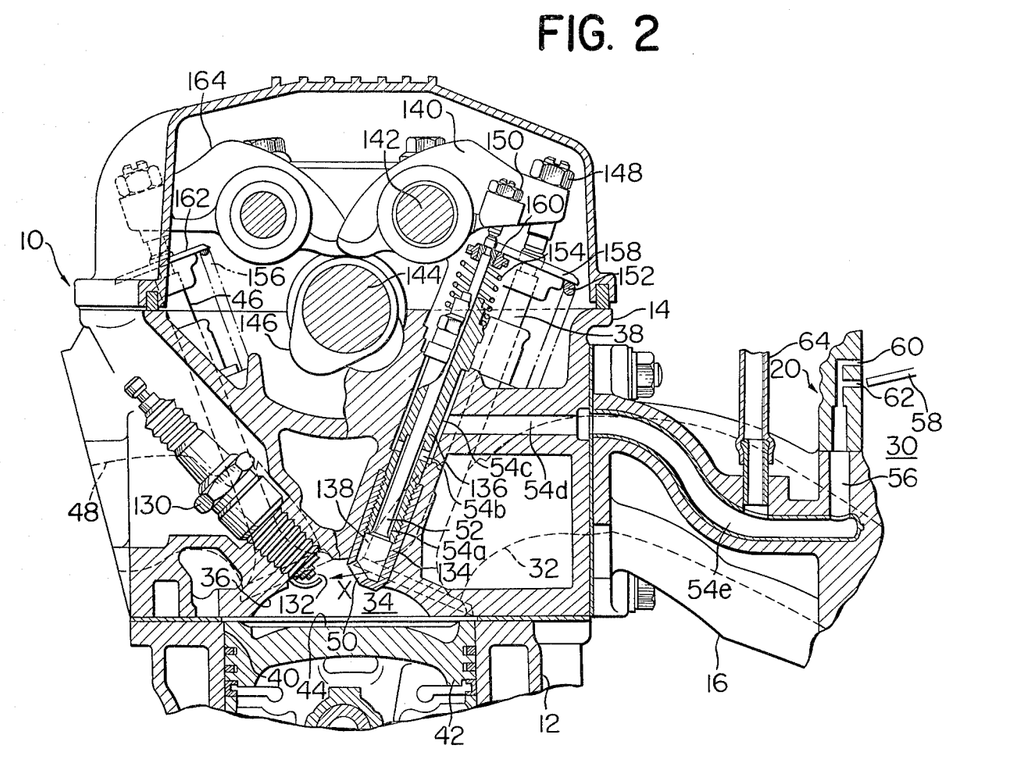
FIG. 2 is a cross-section mainly showing the detail of a part of the engine in FIG. 1.
Figure 3:
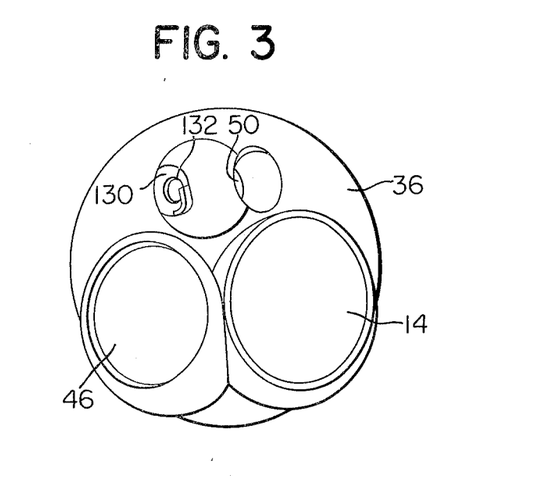
FIG. 3 is a view of a combustion chamber in FIG. 2, seeing from the underside.

Referring to FIGS. 2 and 3 showing the detailed construction of the engine 14, a spark plug 130 is threadedly fixed into the cylinder head 14 such that a spark gap 132 is located on or near an extension of the hemispherical concave surface 36. Adjacent to the spark gap 132, a through bore is provided in the cylinder head 14, into which a hollow cylindrical member 134 forming an injection chamber 138 and a valve guide 136 are inserted. A stem of the valve 52 is slidably mounted in the valve guide 136.

The secondary intake passage 54 is constituted by passages 54a, 54b, 54c, 54d and 54e. The passage 54a of circular ring shape in section is formed by a space between the outer peripheral surface of the stem of the valve 52 and the inner peripheral surface of the valve guide 136 and is communicated through the passage 54b bored in the valve guide 136 with the passage 54c of a circular ring shape in section which is formed by a space between the outer peripheral surface of the valve guide 136 and the inner peripheral surface of said through bore. The passage 54c is communicated with the passage 54d formed in the cylinder head 14, and the passage 54d is communicated with the passage 54e formed integrally with the intake manifold 16. The passage 54e is communicated with the ports 60 and 62 of the carburetor 20 through the branch passage 56 and is led to the air control valve 66 through the branch passage 64 connected midway of the passage 54e. The port 60 is opened in the wall of the main intake passage 30 at a location in which it is always positioned upstream of the throttle valve 58. On the other hand, the port 62 is opened in the wall of the passage 30 at a location in which it is positioned opposite to or slightly downstream of the end of the throttle valve 58 at the normal idle open position thereof but is positioned upstream of the throttle valve 58 when the latter is opened. The secondary intake passage 54a is opened to the injection chamber 138 in the injection chamber forming member 134 and is closed when a face of the valve 52 abuts on a valve seat defined on the end of the valve guide 136. The injection chamber forming member 134 has a portion projecting into the combustion chamber 34, and the injection port 50 is drilled in said projecting portion so as to communicate the injection chamber 138 with the combustion chamber 34. The injection port 50 is provided near the spark gap 132 and directed to or around the spark gap 132.

The main inlet valve 38 and the valve 52 are both poppet valves to be actuated by a single rocker arm 140. The rocker arm 140 is securely fitted on a rocker shaft 142 and has an arm portion abutting on a cam 146 securely fitted on a cam shaft 144 driven by the engine so as to cause rocking movement of the rocker arm 140. The arm portion opposite to that portion abutting on the cam 146 is forked, and adjust screws 148 and 150 are threaded into each bifurcations respectively. An end of the adjust screw 148 abuts on the upper end of the stream of the main inlet valve 38, and an end of the adjust screw 150 abuts on an upper end of the stem of the valve 52. Valve springs 152, 154 and 156 are supported on spring retainers 158, 160 and 162 fixed to the stems of the valves 38, 52 and 46 respectively. A rocker arm 164 for the exhaust valve 46 abuts on the cam shaft 144.

Figure 4:
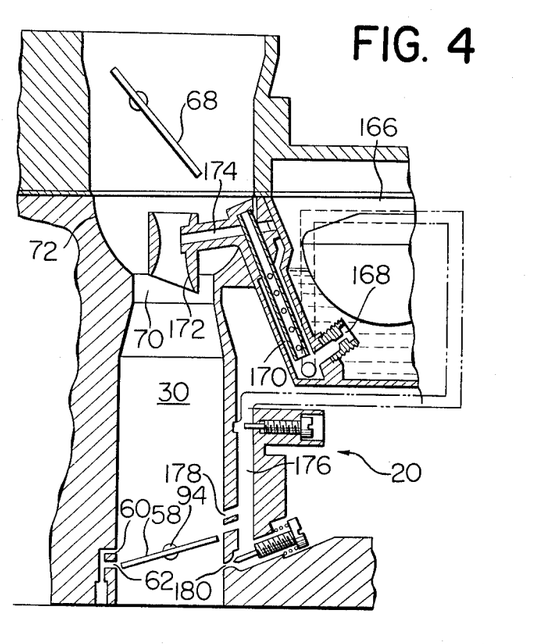
FIG. 4 is a cross-section showing the detail of a carburetor in FIG. 1.

Referring to FIG. 4 showing the detailed construction of the carburetor 20, the carburetor 20 comprises a main or high speed system which leads the fuel from a float chamber 166 through a main jet 168, a fuel passage 170 to a main nozzle 174 opened to an inner venturi 172 in the venturi 70, and an idle or slow speed system which leads the fuel through a fuel passage 176 branched from the fuel passage 170 to a slow port 178 and an idle port 180. The carburetor 20 is of Stromberg type commonly and widely used and having the choke valve 68 in the upstream side of the venturi 70 and the throttle valve 58 in the downstream side. This carburetor 20 is associated with a full-automatic choke mechanism 182, as shown in FIGS. 5 and 6.

Figure 5:
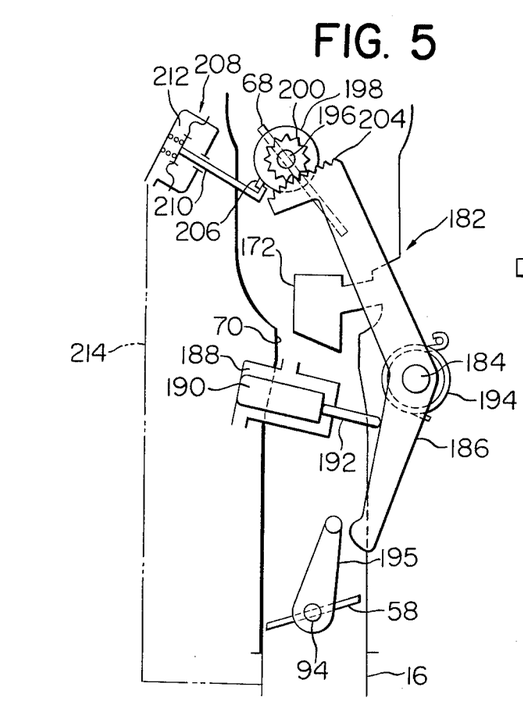
FIG. 5 is a schematic side view of an automatic choke mechanism associated with said carburetor.
Figure 6:
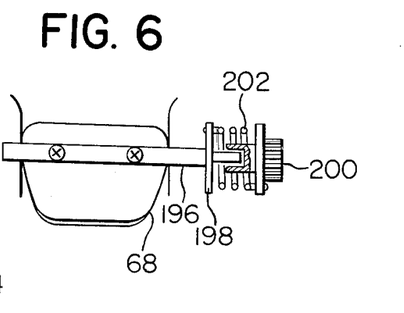
FIG. 6 is a view showing a construction of said automatic choke mechanism in the vicinity of the choke valve.

Referring to FIGS. 5 and 6, the full-automatic choke mechanism 182 includes a choke lever 186 pivotally mounted on a shaft 184 projecting from the body of the carburetor 20. The choke lever 186 extends toward the choke valve 68 and the throttle valve 58. An operating shaft 192 of a thermo wax element 190 provided in a cooling water passage 188 of the engine abuts on the lever 186 which is biased by a spring 194 in a clockwise direction in FIG. 5. The choke lever 186 abuts against the upper end of a throttle lever 195 secured on the throttle shaft 94 when the choke lever 186 is rotated in a clockwise direction in FIG. 5. A choke pinion 200 is disposed opposite to a choke plate 198 integrally fixed to a choke shaft 196 which rotates the choke valve 68. The choke plate 198 and the choke pinion 200 are engaged to rotate relative to each other and connected by means of a strangler spring 202. The choke pinion 200 is engaged with a choke gear 204 formed on the choke lever 186. Furthermore, the choke plate 198 has a projection 206 which is directly engaged by a rod 210 operated by a diaphragm type vacuum motor 208. The vacuum motor 208 has a vacuum chamber 212 which is communicated through a passage 214 with the intake manifold 16 downstream of the throttle valve.

In the abovedescribed full-automatic choke mechanism 182, when the engine is in a cold condition and a temperature of the cooling water in the passage 188 is low, the operating shaft 192 is in a position in which it is retracted inwardly into the wax element 190. In this condition, as there is no vacuum in the intake manifold 16 before starting of the engine, the vacuum chamber 212 of the vacuum motor 208 is at an atmospheric pressure so that the rod 210 is disengaged from the projection 206. Thus, the choke gear 204 on the choke lever 186 being biased by the spring 194 rotates the choke pinion 200 in counterclockwise direction, thereby rotates the choke plate 198 in the same direction through the strangler spring 202 to close the choke valve 68. After the choke valve 68 is fully closed, the choke pinion 200 rotates relative to the choke plate 218, winding up the strangler spring 202.

During the abovedescribed operation, as the choke lever 186 pushes the throttle lever 195 to rotate it in counterclockwise direction against a force of a return spring, not shown, the throttle valve 58 is maintained in a selected open position appropriate for a good starting of the engine according to the water temperature, namely, the first idle open position in which the degree of opening of the throttle valve is larger than the opening degree in its normal idle open position (in the present embodiment, 5° relative to the fully closed position).

When the engine is started by the starter in the above condition, vacuum is generated in the intake manifold 16 and led to the vacuum chamber 212 through the passage 214 to operate the vacuum motor 208. The rod 210 is pulled leftward in FIG. 5 and engages with the projection 206 to rotate the choke plate 198 and to open the choke valve 68 to a predetermined opening degree. If the temperature of the cooling water in the passage 188 rises thenceafter, the operating shaft 192 is correspondingly pushed out rightward in FIG. 5, and the choke lever 186 is gradually rotated in a counterclockwise direction. The throttle valve 58 is returned to its normal idle open position by the force of the return spring, and the choke valve 68 is also opened in accordance with a rise in the temperature of the cooling water.

Figure 7:
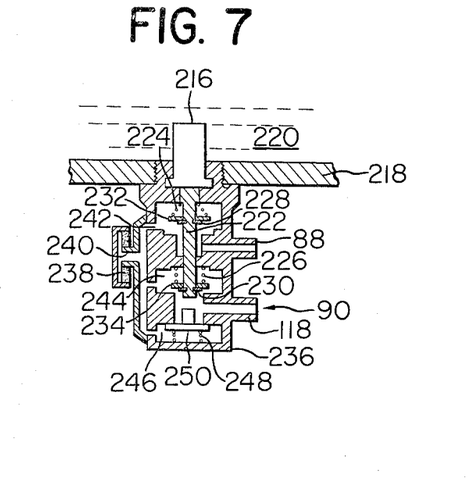
FIG. 7 is a cross-section showing the detail of a thermo valve in FIG. 1.

Referring to FIG. 7 showing the thermo valve 90, a wax element 216 protrudes into the cooling water passage 220 of a heat riser 218 which is provided for heating the air-fuel mixture passing through the main intake passage 30. Two valve plates 232 and 234 are fitted on an operating shaft 222 of the wax element 216 and are urged by springs 224 and 226 to abut on stop rings 228 and 230 respectively. A casing 236 has openings connected to the abovementioned branch passages 88 and 118, an atmospheric port 240 fitted with an air filter 238, a passage 242 communicating the branch passages 88 with the atmospheric port 240 and two passages 244 and 246 communicating the branch passage 118 with the atmospheric port 240.

When the temperature of the cooling water in the passage 220 rises and the operating shaft 222 is pushed out of the wax element 216 to move downward in FIG. 7, the valve plate 234 closes the passage 244 and then the valve plate 232 closes the passage 242. The passage 246 is normally closed by a valve member 250 urged by a spring 248, but is opened when an end of the operating shaft 22 is moved downward to abut on the valve member 250 and push it down. In the present embodiment, when the temperature of the cooling water in the passage 220 is lower than 25° C., both the valve plates 232 and 234 are opened; when said temperature is between 25° C. and 55° C., the valve plate 232 is opened and valve plate 234 is closed; and when said temperature rises higher than 55° C., both the valve plates 232 and 234 are closed and now the valve member 250 is opened.

The operation and effects of the abovedescribed embodiment will be explained in detail.

In driving condition of the engine, most of air inducted from the air cleaner 22 into the main intake passage 30 is mixed with fuel in the carburetor 20 to form an air-fuel mixture having a predetermined air-fuel ratio which is then inducted into the combustion chamber 34 through the inlet port 32. Also, a portion of the inducted air is led into the branch passage 56 through the ports 60 and 62. The air from the passage 56 is mixed with the air from the air cleaner 22 through the branch passage 64 if the air control valve 66 is opened. The air from these passages is led through the secondary intake passage 54 into the injection chamber 138 and then injected into the combustion chamber 34 through the injection port 50.

The amount of the injected air and strength of the jet flow of air from the port 50 vary mainly with the opening degree of the throttle valve 58, namely, with the loading conditions of the engine. During idling or light-loaded driving range in which the opening degree of the throttle valve is small, the amount of the air-fuel mixture supplied from the main intake passage 30 is small due to throttling of the throttle valve 58, and a high vacuum is generated in the combustion chamber 34 during a suction stroke of the engine. Since the interior of the air cleaner 22 or the main intake passage 30 upstream of the throttle valve 58 is at substantially the atmospheric pressure or a low vacuum, a voluminous air is forcibly injected into the combustion chamber 34 through the injection port 50 by a pressure differential between said high and low vacuums. This air jet flow passes through or near to the spark gap 132 to clean both electrodes of the spark plug 130 and remove or blow away the burned gas existing around the spark gap 132. The jet flow also flows down along the hemispherical concave surface 36 to give a strong swirl and turbulence to the air-fuel mixture inducted through the inlet port 32. The swirl and tubulence are maintained to aid mixing of the air-fuel mixture with the injected air during the compression stroke and to aid propagation of the flame after ignition of the resultant mixture. Further, when the mixture is ignited at the spark gap 132, a portion of the flame enters into the injection chamber 138. Since some of the mixture has entered in the injection chamber 138 during the previous compression stroke and since the injection chamber 138 is small, temperature and pressure therein become high by rapid combustion of the mixture therein. The flame produced in the injection chamber 138 is forcibly injected through the injection port 50 into the combustion chamber 34 to accelerate the combustion of the mixture progressing in the combustion chamber.

Due to elevation of ignition of the mixture and velocity of combustion, a limit of combustion of the lean mixture is remarkably extended and the fuel consumption is lessened compared with a conventional engine. However, an excessive supply of the air from the injection port 50 greatly reduces a density of the air-fuel mixture set by the carburetor 20. In particular, the excessive supply of the air during warming-up of the engine incurs not only power drop but also violent vibration or stoppage of the engine. Therefore, it is necessary to control the amount of air injected from the injection port 50 according to the driving conditions.

According to this invention, by an adoption of the full-automatic choke mechanism 182, the choke valve 68 is closed to an appropriate degree according to the temperature of the cooling water of the engine during its warming-up, and the rich air-fuel mixture having an air-fuel ratio of about 10–13 to 1 is produced in the carburetor 20 during operation of the choke valve 68.

When the temperature of the cooling water is below 25° C., both the passages 88 and 118 of the thermo valve 90 are opened to atmosphere so that the chamber 80 of the first control valve 74 and the chamber 112 of the air control valve 66 are maintained at the atmospheric pressure. Both the valves 74 and 66 are closed by force of the springs 82 and 116 to prevent recirculation of the exhaust gas into the main intake passage 30 and supply of air thereinto through the branch passage 64, respectively. Also, since the air pressure existing around the ports 60 and 62 downstream of the choke valve 68 is low due to operation of the choke valve 68, the amount of the air or lean air-fuel mixture injected into the combustion chamber 34 from the injection port 50 is very small. Therefore, the mixture produced in the combustion chamber 34 is maintained substantially as the rich air-fuel mixture having the air-fuel ratio of about 10–13 to 1 as produced by the carburetor 20, so that the combustion of the mixture in the cold condition of the engine is carried out efficiently and the vibration and stoppage of the engine are prevented.

When the engine is warmed up and the temperature of the cooling water rises to higher than 25° C., the combustion of the mixture in the combustion chamber 34 becomes better and the mixture may be made leaner accordingly. If an overall air-fuel ratio of the mixture in the combustion chamber is varied approximately to an overall air-fuel ratio of the mixture formed after completion of the warming-up by fully opening the choke valve 68, the combustion will deteriorate again since the engine is not yet completely warmed up. However, during operation of the choke valve 68, as the catalytic converter 24 is at a low temperature and does not sufficiently work, a relatively large amount of unburned gases such as CO and HC is discharged. Hence, in order to reduce the discharge of the noxious unburned gases, it is desirable to bring the overall air-fuel ratio of the mixture in the combustion chamber 34 close to the overall air-fuel ratio established after the warming-up, as earlier as possible during the warming-up of the engine.

In this embodiment, said overall air-fuel ratio established after the warming-up is set up about 15–17 to 1 so as to form a lean mixture in a partial-loaded driving condition of the engine.

In this embodiment, when the temperature of the cooling water becomes in the range of 25° C.–55° C., the valve plate 234 of the thermo valve 90 is closed to prevent the flow of the atmospheric air into the passage 118. The vacuum produced in the port 122 is led through the passage 120, the flow restriction means 128 and the passage 114 into the chamber 112 of the air control valve 66. If the vacuum in the chamber 112 becomes higher than a predetermined value, the diaphragm 104 is displaced rightward in FIG. 1 against the force of the spring 116 and the valve member 100 opens the passage 64. Due to the positioning relationship between the port 122 and the throttle valve 58, the vacuum produced in the port 122 is very low when the throttle valve 58 is in the idle open position, but becomes so high as to open the air control valve 66 when the throttle valve is opened more than the predetermined opening degree. Consequently, at the cooling water temperature in the range of 25° C.–55° C., when an accelerator pedal, not shown, is depressed and the throttle valve 58 is opened over the predetermined opening degree as at the light-loaded driving condition of the engine, a voluminous amount of air is led from the passage 64 to the secondary intake passage 54 and injected through the injection port 50 into the combustion chamber 24. A flow resistance in the passage 64 is so determined that the mixture produced in the combustion chamber 34 by injecting the air has an overall air-fuel ratio of about 13-14 to 1, which is larger than the air-fuel ratio of about 12-13 to 1 of the air-fuel mixture produced by the carburetor 20.

Usually, a mixture made leaner by the injected air causes poorer combustion. However, in the present invention, due to cleaning up of the electrodes of the spark plug 130 by the injected air, generation of swirls and turbulence as well as the jet flow of flame out of the injection chamber 138, the combustion of the mixture is well improved so that the power drop and deterioration of the drivability are minimized. Further, due to the lean mixture, fuel consumption is lessened and the amount of discharge of the unburned gases is extremely reduced.

When the temperature of the cooling water rises to higher than 55° C., combustion of the mixture in the combustion chamber 34 becomes better, and the choke valve 68 is held in a fully opened condition by the full-automatic choke mechanism 182. By opening of the choke valve 68, the air-fuel mixture produced by the carburetor 20 becomes leaner. Also the vacuum produced at the ports 60 and 62 is lowered and the amount of air or very lean air-fuel mixture led from the ports 60 and 62 to the passage 54 through the passage 56 increases accordingly. At this time, the valve member 250 of the thermo valve 90 is opened so that the air control valve 66 is closed again. On the other hand, as the passage 242 is closed by the valve plate 232, the vacuum in the main intake passage 30 is led into the chamber 80 of the first control valve 74 through the passage 86 and the first control valve 74 is opened or closed according to the value of the vacuum produced. Thus, in the driving condition when the temperature of the cooling water is above 55° C., an appropriate amount of the air adjusted by throttling of each port 60, 62 is led to the injection port 50. When the throttle valve 58 is in a partial-loaded condition, the first and second control valves 74 and 76 are opened to recirculate the exhaust gas into the main intake passage 30.

In the steady driving condition, the overall air-fuel ratio of the mixture produced in the combustion chamber 34 is set up about 15-17 to 1 so as to form a lean mixture. A weight percentage of an amount of the fresh intake air versus an amount of the recirculated exhaust gas is controlled within a range of about 25% according to the driving condition, thereby minimizing generation of NOx by said lean mixture and the recirculated exhaust gas.

The amount of the air injected from the injection port 50 is apt to become excessive as the vacuum produced in the combustion chamber 34 during a suction stroke is high at idling. In this embodiment, however, since the port 62 is positioned understream of the throttle valve 58 at the idle open position thereof, high vacuum is produced at the port 62, thereby reducing the amount of air supply to the injection port 50. Also, during the warming-up when the temperature of cooling water is at 25° C.-55° C., as the port 122 is positioned upstream of the throttle valve 58 unless the latter is opened over the predetermined opening degree, the air control valve 66 is closed to prevent deterioration of the drivability caused by an excessive amount of air injected from the injection port 50.

The flow restriction means 128 is so provided that during the warming-up when the cooling water temperature is at 25° C.-55° C., if the throttle valve 58 is rapidly closed after it is opened over the predetermined degree, the air control valve 66 is closed with a time delay of a few seconds to prevent the mixture from becoming excessively rich upon abrupt deceleration. Also, the check valve 126 of the flow restriction means 128 is so provided that when the throttle valve 58 is rapidly opened from its idle open position upon acceleration, the high vacuum is immediately led to the chamber 112 to open the air control valve 66 simultaneously with the accelerating operation.

Figure 8:
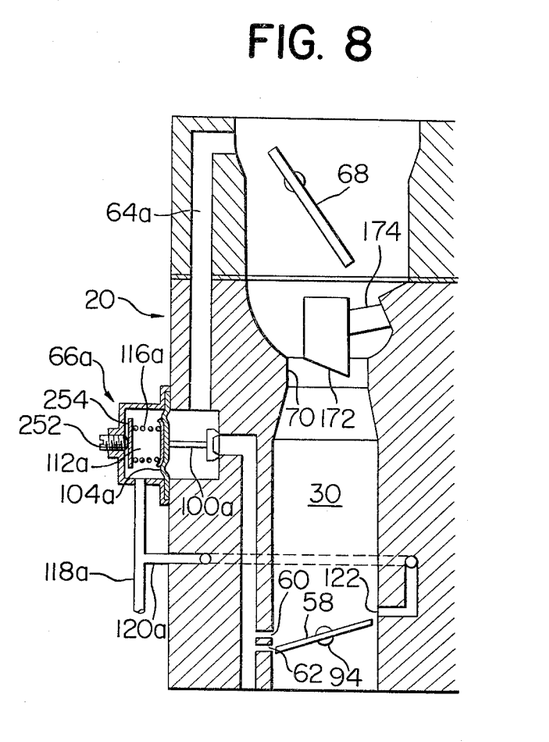
FIG. 8 is a partial cross-section of the carburetor of a modification of the invention.

FIG. 8 shows another embodiment of this invention. The elements similar to those in the above first embodiment are designated by the same numerals. In this embodiment, instead of the passage 64 and the air control valve 66 in the first embodiment, a passage 64a is provided in the body of the carburetor 20 to communicate with the passages 56 and 54 provided in the intake manifold 16. The upstream end of the passage 64a is opened to the main intake passage 30 upstream of the choke valve 68. An air control valve 66 is provided in the passage 64a and has a valve member 100a connected to the central portion of a diaphragm 104a. A spring 116a is interposed between the diaphragm 104a and a spring retainer 254 and urges the diaphragm 104a in a direction to close the valve member 100a. A force of the spring 116a is adjusted by an adjust screw 252. A chamber 112a is communicated with the thermo valve 90 in the first embodiment through a passage 118a as well as with the port 122 through a passage 120a.

This arrangement makes the system compact and the operation thereof is the same as the first embodiment.

What is claimed is:

1. A secondary intake gas control system for a spark-ignition internal combustion engine having air-fuel mixture supply means having a throttle valve and a choke valve in a main intake passage of the engine, and a secondary intake gas supply means for injecting air or a lean air-fuel mixture into a combustion chamber in order to give a swirl and turbulence to an air-fuel mixture supplied into said combustion chamber through said air-fuel mixture supply means, said secondary intake gas supply means including an injection port opened to said combustion chamber, and secondary intake passage means communicated with said injection port through a valve which is opened at a suction stroke of the engine, said control system comprising air control valve means through which said secondary intake passage means is communicated with atmosphere upstream of the location of said choke valve in the main intake passage, said secondary intake passage means being also opened to the main intake passage downstream of the location of the choke valve, said air control valve means comprising a valve member, actuating means for actuating said valve member, means for sensing a temperature of the engine, and means for sensing a degree of opening of the throttle valve, said actuating means being operated by said means for sensing the temperature of the engine and said means for sensing the degree of opening of the throttle valve to open said valve member to communicate the secondary intake passage means with atmosphere when the degree of opening of the throttle valve is above a predetermined opening degree at a predetermined temperature range of the engine during warming-up thereof.

2. A secondary intake gas control system according to claim 1, wherein said valve member is adapted to open and close the port of the secondary intake passage means communicating with atmosphere upstream of the choke valve, said actuating means comprising a pressure chamber and a pressure responsive member operated to open and close said valve member according to a magnitude of pressure acting in said pressure chamber, said means for sensing the temperature of the engine being a thermo valve connected to said pressure chamber through an air passage and adapted to open said pressure chamber to atmosphere, said means for sensing the degree of opening of the throttle valve being a port provided in a wall of the main intake passage at a location in which the port is positioned upstream of the throttle valve when the latter is in an idle open position but is positioned downstream of the throttle valve when the latter is opened over said predetermined opening degree, said port being communicated with said pressure chamber through an air passage.

3. A secondary intake gas control system according to claim 2, wherein flow restriction means is provided in the air passage for communicating between said pressure chamber and said port opened to the wall of the main intake passage.

4. A secondary intake gas control system according to claim 3, wherein said flow restriction means comprises an orifice and a check valve which are provide in a parallel relationship, said check valve permitting only a flow in a direction from said pressure chamber to said port.

5. A secondary intake gas control system according to claim 2, wherein it is associated with an automatic choke mechanism comprising an interlocking mechanism for moving said throttle valve to a first idle open position in which the degree of opening of the throttle valve is slightly greater than that in the normal idle open position when said choke valve is fully closed, and thermo control means responsive to an increase of the temperature of the engine such as the engine cooling water to correspondingly open said choke valve and decrease the degree of opening of said throttle valve.

6. A secondary intake gas control system according to claim 5, wherein said automatic choke mechanism is a full-automatic type in which said choke valve is automatically opened gradually according to the increase of the temperature of the engine sensed by the thermo control means and said throttle valve is gradually returned to the normal idle open position, said air control valve means is operated to open the valve member thereof when said throttle valve is opened over said predetermined opening degree at the predetermined temperature range of the engine during operation of the full-automatic choke mechanism.

7. A secondary intake gas control system according to claim 1, wherein said secondary intake passage means is communicated with the main intake passage downstream of the location of the choke valve through a port which is always positioned upstream of said throttle valve and through another port which is positioned opposite to or downstream of an end of said throttle valve when the latter is in the idle open position but is positioned upstream of the throttle valve when the latter is opened above a predetermined opening degree.

8. A secondary intake gas control system according to claim 1, wherein said valve member is adapted to open and close the port of the secondary intake passage means communicating with atmosphere upstream of the choke valve, said actuating means comprising a pressure supply line connecting thereto and having a pair of parallel input passages one of which connects to said means for sensing the temperature of the engine, and the other of which connects to said means for sensing the degree of opening of the throttle valve.

* * * * *